United States Patent [19]
Wood

[11] 3,826,070
[45] July 30, 1974

[54] PRESS OPERATING MECHANISM FOR STACK-FORMING MACHINE

[75] Inventor: William Robert Wood, Ankeny, Iowa

[73] Assignee: Deere & Company, Moline, Ill.

[22] Filed: June 14, 1973

[21] Appl. No.: 370,152

[52] U.S. Cl.................. 56/344, 56/361, 100/245
[51] Int. Cl............................................. A01d 89/00
[58] Field of Search..................... 56/341, 344–361, 56/364; 100/240, 245

[56] References Cited
UNITED STATES PATENTS
3,691,741  9/1972  White et al............................ 56/344

Primary Examiner—Antonio F. Guida
Assistant Examiner—J. N. Eskovitz

[57] ABSTRACT

Mechanism for raising and lowering the press or roof on a mobile stack-forming machine, the mechanism including a fore-and-aft pair of cranks mounted on each side of the machine for vertical swinging movement above horizontally coplanar transverse axes, a longitudinally extending horizontal link connecting each pair of cranks, a vertically extending link connecting each crank with the roof, and means for swinging the first crank in each fore-and-aft pair about its transverse axis, the longitudinally extending links serving to simultaneously swing the rear crank in each pair about its axis, and the vertically extending links connecting each of the cranks to the roof serving to raise and lower the roof as the cranks are swung about their axis, the parts being so arranged and constructed that the roof remains level as it is raised and lowered relative to the body of the machine.

13 Claims, 4 Drawing Figures

PRESS OPERATING MECHANISM FOR STACK-FORMING MACHINE

BACKGROUND OF THE INVENTION

The present invention relates generally to a mobile stack-forming machine of the type having a roof that is raised and lowered relative to a crop-receiving body for compacting crop material contained in the body from time to time to form a compressed stack, and more particularly to apparatus usable with such a stack-forming implement for effecting vertical movement of the roof.

Stack-forming machines of the type having a mobile frame, a crop-receiving body mounted on the frame, and means supported on the frame forwardly of the crop-receiving body for picking crop material up off the field and delivering it rearwardly to the body are old and well known in the art. See, for example, U.S. Patents 51,500, issued Dec. 12, 1865 to Wallace and 3,728,849, issued April 24, 1973 to Lundahl. It is also an old and well known expedient to provide means on the implement for compacting the crop in the body from time to time to form a more dense stack of material, and to discharge the stack from the body without substantially disturbing its shape. See, for example, U.S. Patents 523,707, issued July 31, 1894 to Keith, 3,556,377, issued Jan. 19, 1971 to Garrison, and 3,691,741, issued Sept. 19, 1972 to White et al. Various mechanisms have been employed in the past for effecting vertical movement of the crop compressor, as evidenced by the devices illustrated in the last-mentioned group of prior art patents.

SUMMARY OF THE INVENTION

It is an object of the present invention to provide improved means for effecting vertical movement of the crop compressor on a mobile stack-forming machine of the type described. More particularly, it is an object of the invention to provide such mechanism that is simple and reliable in operation and economical to manufacture. It is a further object to provide such mechanism that is operative to at all times maintain the compressor in a level condition as it is raised and lowered relative to the body.

It is yet a further object to provide such mechanism that is faster in operation and capable of exerting a greater compressing force than devices of the type heretofore known.

In pursuance of these and other objects, the invention comprises a fore-and-aft pair of cranks mounted on each side of the crop-receiving body of the implement for swinging movement about horizontally coplanar transverse axes. The cranks are connected for parallel movement by a longitudinally extending horizontal link, and a vertical rigid link connects a point on each crank with the roof or press. The front crank in each fore-and-aft pair is swung about its transverse axis by means of a longitudinally extending hydraulic cylinder which interconnects the crank with a forward point on the implement frame. As the forward crank in each pair is rotated, the horizontal link causes the rear crank to rotate in parallel relation, and the vertical links which interconnect both cranks with the roof transmit rotary motion of the cranks to vertical linear motion of the roof. The various parts of the mechanism are so arranged and constructed that the roof is maintained in a level condition throughout it range of vertical movement. According to a further feature of the invention, means connecting the rear crank in at least one of the pairs with a rear door on the crop-receiving body is provided to control swinging of the rear door into and out of closing relation with the rear of the body in response to vertical swinging movement of the crank about its transverse axis.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
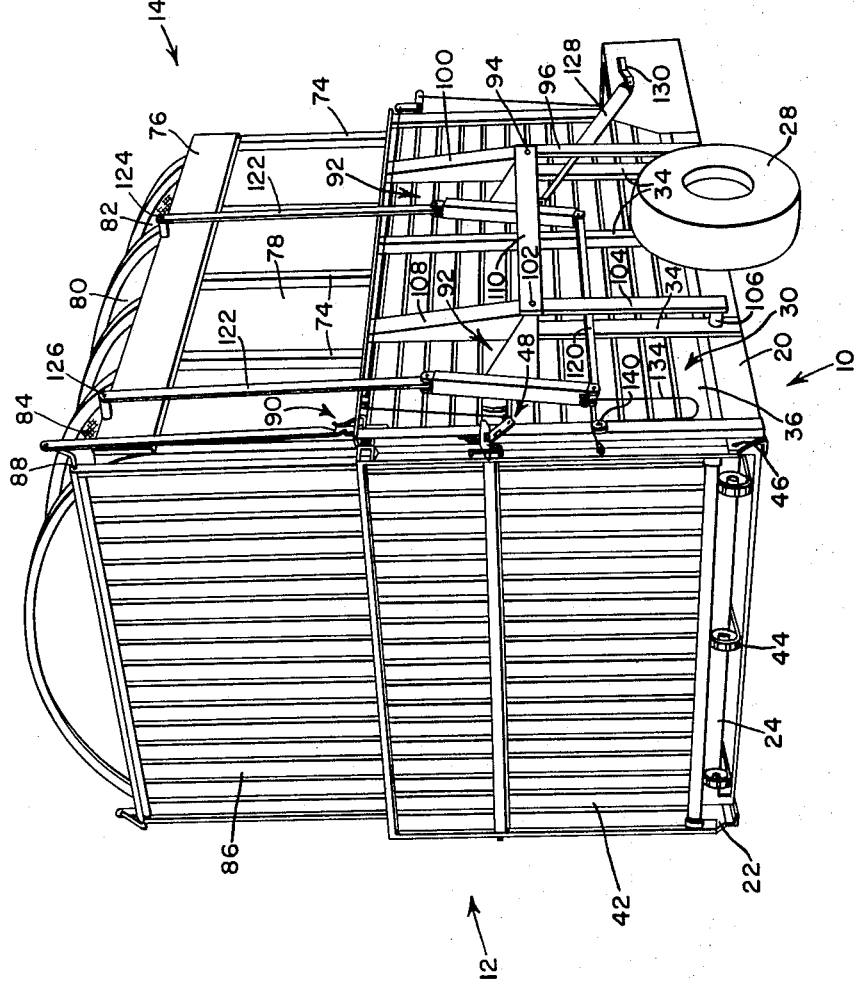
FIG. 1 is a perspective view of a stack-forming machine incorporating the mechanism of the present invention, taken from the right rear of the machine and showing the roof or press in its raised position.

Referring now to the drawings, the stack-forming implement of the invention comprises, generally, a mobile frame 10 adapted to be towed by a tractor, a crop-receiving body 12 carried by the frame, a press 14 or roof for the body 12 mounted on the latter for vertical reciprocable movement, the roof being operative to compress material in the body, a material pickup and delivery unit 16 mounted on the frame forwardly of the body 12 and operative to pick material such as windrowed hay or corn stover up off the ground and propel the same upwardly, and a material delivery spout 18 for directing the material from the pickup unit rearwardly into the body 12. Although the left side of the machine is not shown in the drawings, the machine is generally symmetrical about its longitudinal axis and the ensuing description of those elements on the right side of the machine will thus be analogously applicable to the left side of the machine unless otherwise indicated.

The frame 10 includes a pair of longitudinally extending, transversely spaced beams 20 and 22 on the right and left sides, respectively, of the implement, a transverse beam (not shown) connecting the extreme forward ends of the longitudinal beams 20 and 22, and a transverse beam 24 connecting the extreme rearward ends of the longitudinal beams. A triangular hitch structure 26 is fixed centrally to the forward ends of the longitudinal beams and extends forwardly therefrom, the structure being adapted at its forward ends for attachment to the drawbar of a conventional agricultural tractor. A pair of ground-engaging wheels 28 are rotatably mounted on the midportions of the beams 20 and 22, to support the frame relative to the ground.

The body 12 is formed in part by a pair of vertically extending walls 30 and 32 on the right and left sides, respectively, of the implement. The right wall 30 of the body 12 includes a plurality of vertical support members 34 fixed at their lower ends to the longitudinal beam 20, and a rectangular, corrugated sheet metal section 40 secured to the upper side of the beam 20 and the inner sides of the supports 34. The body 12 further includes a horizontal floor 38 which extends transversely between the longitudinal beams 20 and 22, a front wall 40 which encloses the forward ends of the sides 30 and 32 and bottom 38, and a rear door 42 which encloses the rear ends of the sides and bottom. A conveyor 44 is movable rearwardly along the top surface of the floor 38 to remove the finished stack from the body 12. The rear door 42 is pivotally connected at 46 to the container floor for vertical pivotal movement between the raised or closed position shown in FIGS. 1–3 of the drawings, and a lowered or opened position in which the outer end rests on the ground and the door acts as a ramp for unloading the completed stack from the container. The door is shown midway between its opened and closed positions in FIG. 4. A latch mechanism designated generally by the numeral 48 maintains the door 42 in its raised position during the stack-forming process, and may be actuated by the operator to release the door in response to vertical movement of the roof 14 as is described in detail in copending U.S. application Ser. No. 371,734.

The crop pickup unit 16 is suspended on the frame for limited vertical movement through the rectangular opening defined by the longitudinal beams 20 and 22, the front transverse frame member, and the rear wall 40 of the container. The unit includes a housing 50 which is formed integrally with and at the lower end of the spout 18, a transverse shaft 52 supported at opposite ends in the sidewalls of the housing 50, and a plurality of crop pickup and propelling paddles 54 pivotally supported on the shaft 52. The upper end of the pickup unit and spout combination is supported on the crop-receiving body by a pair of fore-and-aft extending arms 56 which are pivoted at their forward ends to the sides of the spout 18 and at their rear ends to brackets 58 fixed to the front wall 40. The lower end of the unit is supported on the frame for vertical adjustment in a manner not material to the present invention and therefore not fully disclosed. The lower support may take the form of the apparatus disclosed for this purpose in copending U.S. application Ser. No. 344,712. A major portion of the weight of the pickup unit and spout is supported from the front wall of the body by a pair of springs 60 which connect the unit 16 with brackets 62 on opposite sides of the wall. The anchors for the springs include threaded rod and nut adjustment members for adjusting the amount of force exerted by the springs. The suspension mechanism for the pickup unit permits the unit to "float" vertically relative to the frame to conform to variations in the surface of the ground.

The spout 18 has a generally vertical lower portion 64 communicating at its lower end with the pickup unit housing 50, and an arcuate upper portion 66 terminating in a rearwardly directed discharge opening 68. In operation, the pickup unit shaft 52 is driven in a counterclockwise direction as viewed in FIGS. 2 and 3, causing the paddles 54 to extend radially outwardly from the center of the shaft and define the cylinder shown in dotted lines in the drawings. The shaft is driven from the power take-off on the tractor used for towing the implement, through conventional drive means enclosed by sheet metal shields 70 and 72. As the paddles rotate in the manner described, they engage crop material lying on the ground, such as windrowed alfalfa or the like, and propel it upwardly through spout 18. The curved leading wall of the spout portion 66 directs the material rearwardly through the discharge opening 68 and into the crop-receiving body 12.

The roof 14 has an inverted U-shaped configuration and comprises five equally spaced U-shaped support members 74 which have vertical leg portions extending upwardly in parallel relation to and inwardly of the walls 30 and 32 of the body 12. The members 74 are rigidly connected by means of a longitudinal brace 76 which extends between the upper ends of the vertical leg portions of the members. A rectangular sheet metal panel 78 is secured to the inner sides of the vertical legs of the members 74 below the brace 76, a curved sheet metal panel 80 extends between the curved portions of the second and fourth members 74 and is secured to the inner sides thereof, and curved sections of heavy gauge screen 82 and 84 extend between the first and second and fourth and fifth members 74, respectively, and are similarly secured to the inner sides thereof. Screen sections 82 and 84 allow excess air blown into the body by the unit 16 to escape. The roof 14 further includes a rear door 86 which is pivoted along its upper edge at 88 and is swingable between its lowered position shown in the drawings in a generally horizontal position to permit removal of the completed stack from the body 12. A control mechanism designated generally by the numeral 90 is provided for selectively controlling the movement of the roof rear door 86 in response to vertical movement of the roof. A detailed description of this mechanism, which is not pertinent to the present invention, may be had by reference to copending U.S. application Ser. No. 371,734. As is apparent from the drawings, the sidewalls of the roof are disposed just inwardly of the sidewalls of the body, and the rear door 86 of the roof is disposed just inwardly of the rear door 42 of the body, so that the roof is free to move vertically relative to the body between a raised position shown in FIGS. 1 and 2 and a lowered position shown in FIG. 3.

Mechanism connecting the roof to the body and operative to effect vertical movement of the roof relative to the body between its raised and lowered positions is provided on each side of the implement. The mechanism on the left side of the implement is a mirror image of that on the right side, and the ensuing description of the latter is thus analogously applicable to the former. The mechanism includes a pair of fore-and-aft, identical T-shaped crank members 92 pivotally mounted on the sidewall 30 for vertical swinging movement about horizontally coplanar, longitudinally spaced transverse axes. The front transverse axis is defined by a pin 94 which extends transversely between one of the vertical supports 34 and a vertical bar 96 which is disposed outwardly from and in spaced relation to the support. The lower end of the bar 96 is connected to the outer end of a cylindrical spacer 98 which is, in turn, connected to the outer side of the frame member 20, and the upper end of the bar is connected to a tapered brace 100 which is fixed to the upper portion of the support. Similarly, the rear transverse axis is defined by a pin 102 which extends transversely between another of the vertical supports 34 and a vertical bar 104 which is disposed outwardly from and in spaced relation to the support. The lower end of the bar 104 is connected to the outer end of a second cylindrical spacer 106 on the outer side of the frame member 20, and the upper end is connected to a second tapered brace 108 fixed to the upper portion of the support. A support 110 extends longitudinally between the upper ends of the vertical bars 96 and 104, in spaced relation to the wall 30.

Each of the crank members 92 includes a first portion 112 pivotally mounted at one end on one of the pins 94 and 102, and a second portion 114 fixedly connected at its midpoint to the opposite end of the portion 112. The ends of the portion 114 are bifurcated and support pivot pins 116 and 118 which define first and second transverse pivot members, respectively. A horizontal link 120 connects the first pivot members 116 on the cranks and acts to maintain a fixed horizontal distance between the first pivot members equal to the distance between the pins 94 and 102, and thereby to maintain the cranks in parallel relation at all times. A fore-and-aft pair of vertical links 122 connect the second pivot members 118 on the cranks with fore-and-aft transverse pins 124 and 126, respectively, on the outer side of the brace 76.

Figure 2:
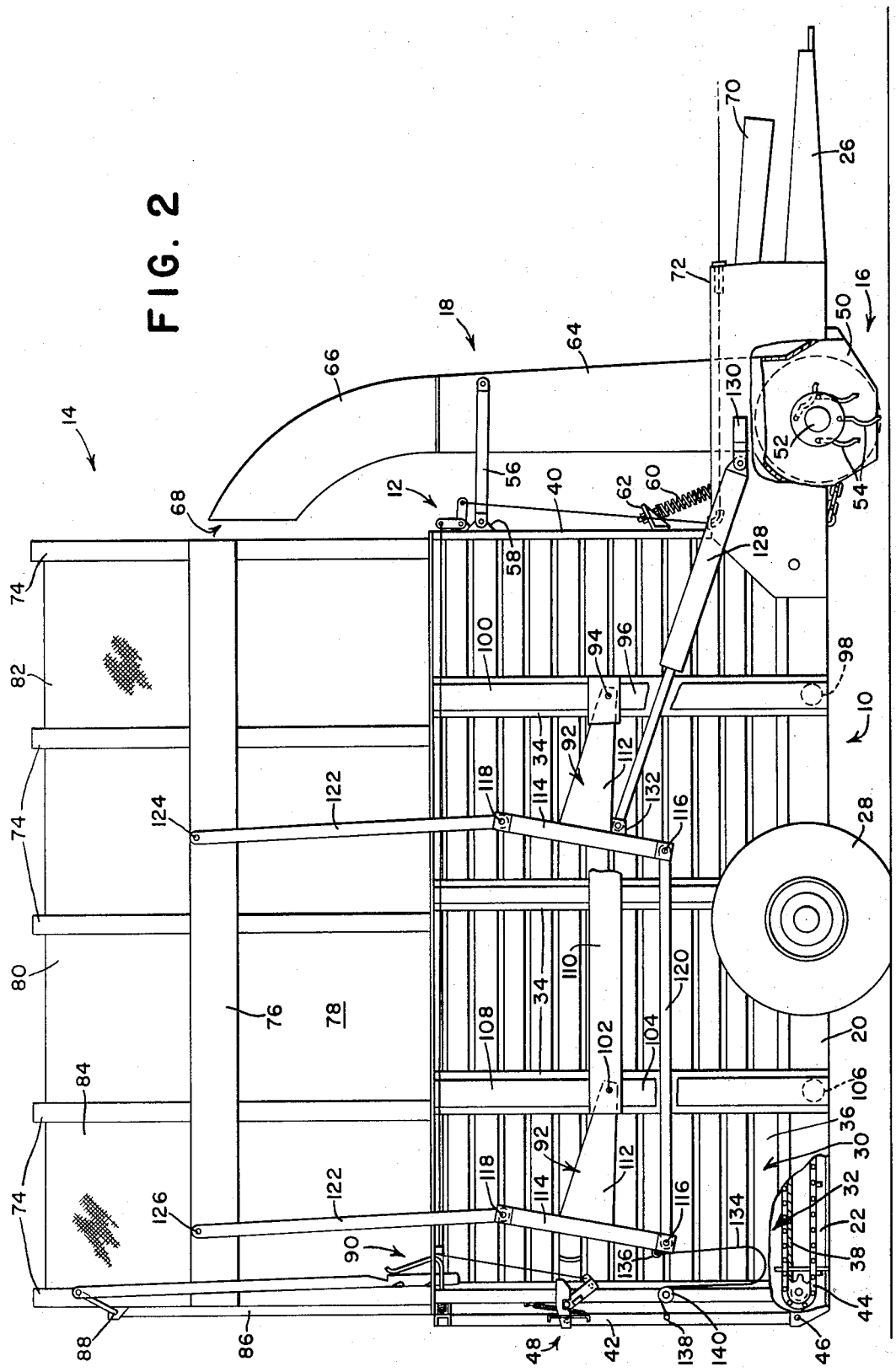
FIG. 2 is a right side elevational view of the machine shown in FIG. 1, with portions broken away to more clearly illustrate the invention.
Figure 3:
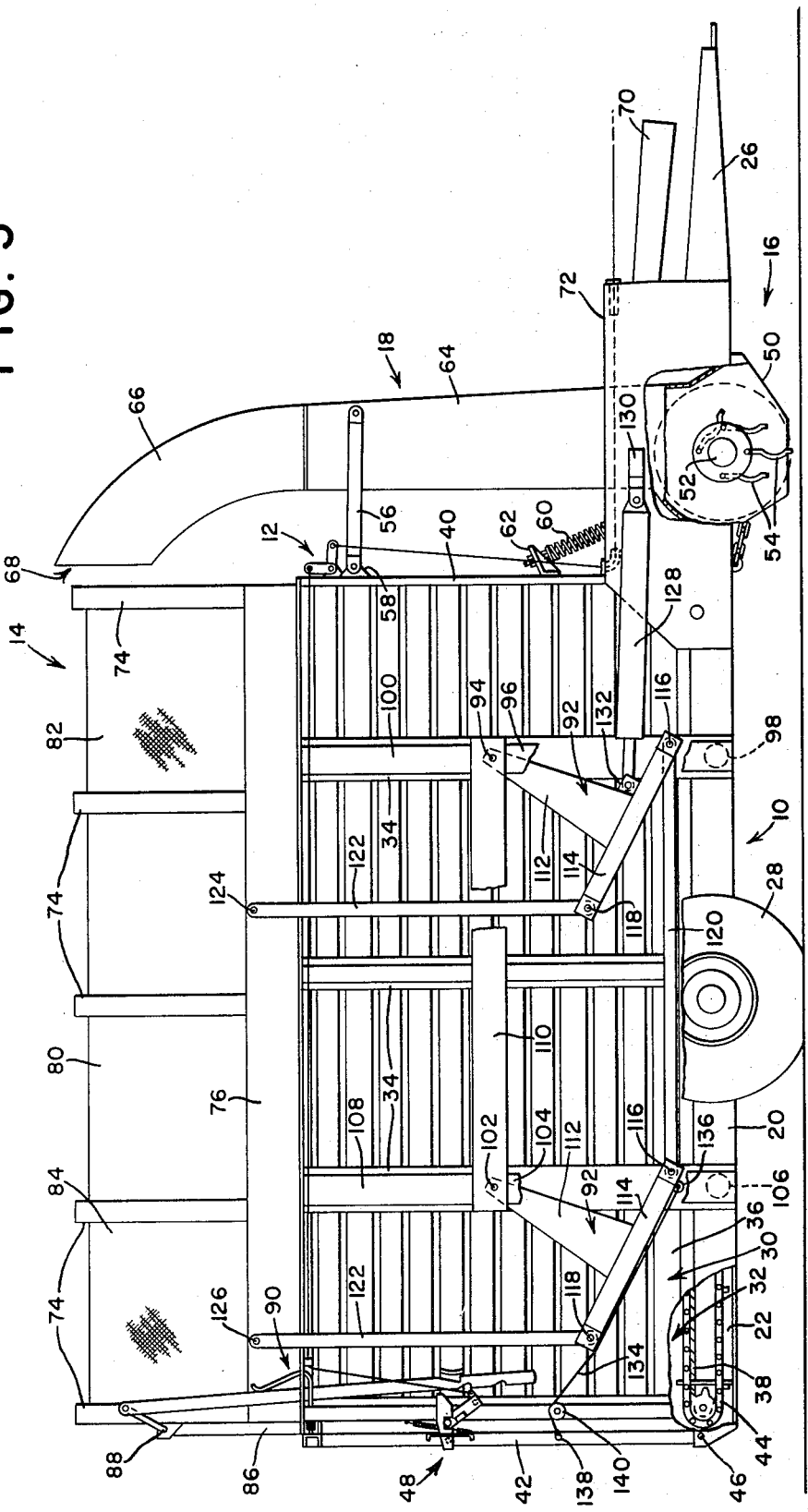
FIG. 3 is a right side elevational view of the machine similar to FIG. 2 but with the roof in its lowered position.
Figure 4:
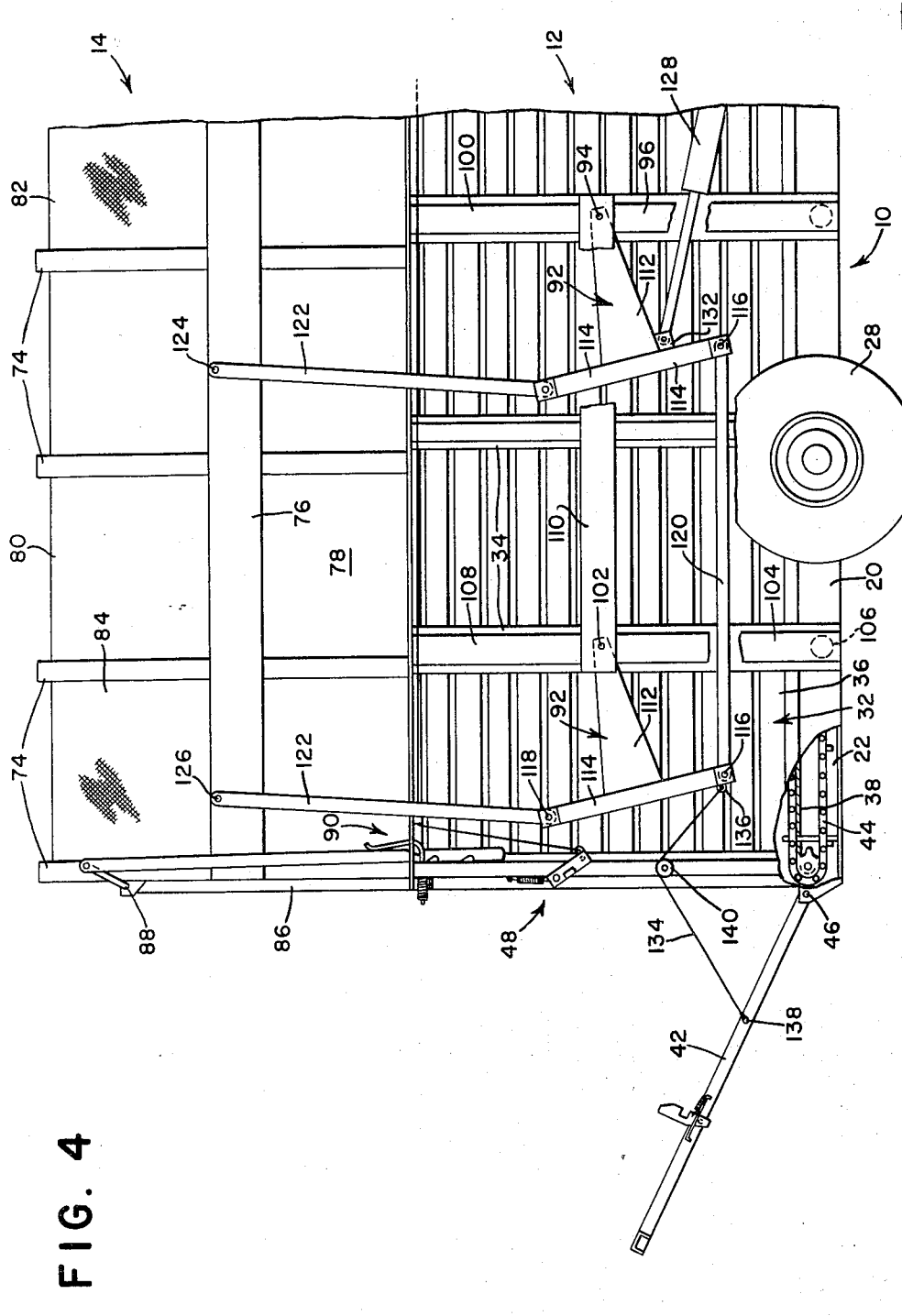
FIG. 4 is a fragmentary right side elevational view of the machine showing the roof between its raised and lowered positions and showing the rear door between its opened and closed positions.

Completing the mechanism is a hydraulic cylinder 128 which extends longitudinally through the space between the vertical bar 96 and its adjacent vertical support member 34, and connects a bracket 130 on the forward end of the implement frame and a bracket 132 on the front crank member 92. The cylinder is connectable through means not shown with the hydraulic system on the tractor used for towing the implement and is extensible and retractable to swing the front crank 92 about the pin 94 between alternate positions shown in FIGS. 2 and 3. Movement of the front crank is transferred to the rear crank by the horizontal link 120, and pivotal movement of each of the cranks is translated to vertical movement of the top by means of the vertical links 122. As will be apparent from the drawings, when the cylinder 128 is retracted as shown in FIG. 3, the top 14 is in its lowered position, and when the cylinder is extended as shown in FIG. 2, the top is in its raised position. As will also be apparent, as the cranks move between their positions corresponding to the raised and lowered positions of the roof, the first pivot member 116 on each of the cranks moves through an arc bisected by the transverse vertical plane containing the axis about which the crank is swingable, and the second pivot member 118 moves through an arc bisected by the horizontal plane containing the same axis.

According to a further feature of the invention, movement of the rear door 42 of the crop-receiving body between its opened and closed positions is controlled by the rear crank 92. A flexible cable 134 is connected at one end to a bracket 136 fixed to the portion 114 of the rear crank and at the other end to a pin 138 on the side of the door 42. The cable is trained around a sheave 140 rotatably mounted on the side of the crop-receiving body. As the roof is raised during its normal compression cycle, the cable will merely slacken as shown in FIG. 2. However, when the operator actuates the mechanism 48 to unlatch the door 42 in preparation for discharging the completed stack from the crop-receiving body, the cable 134 will gradually lower the door to its opened position wherein it serves as a ramp for discharging the stack from the body. Conversely, as the roof is lowered following removal of the stack, the cable 134 will lift the door back to its closed position.

I claim:

1. In a crop-harvesting machine having a mobile frame, a crop-receiving body supported rearwardly on the frame and including a transversely spaced pair of longitudinally extending, vertical sidewalls, crop pickup and delivery means supported on the frame forwardly of the crop-receiving body for picking crop material up off the ground and delivering the same rearwardly to the crop-receiving body, and a roof supported on the body for movement between raised and lowered positions, the roof being operable to compress crop material contained in the body, means for effecting vertical movement of the roof comprising: a pair of front and rear crank members mounted on each side of the crop-receiving body for vertical swinging movement about horizontally coplanar, longitudinally spaced front and rear transverse axes, each crank having first and second transverse pivot members thereon spaced from the transverse axis about which the crank is swingable and from each other, the relative locations of the transverse axis and the first and second transverse pivot members on the cranks in a front and rear pair being substantially identical; a longitudinally extending, horizontal rigid link connecting the first transverse pivot members on the cranks in each pair, each link being operative to maintain a fixed horizontal distance between the first transverse pivot members which it connects, said fixed horizontal distance being substantially identical to the horizontal distance between the front and rear transverse axes about which the cranks are swingable; a vertically extending rigid link interconnecting the second transverse pivot member on each crank with the roof; and means acting between the frame and one of the cranks on each side of the body for rotating the crank and thereby moving the roof vertically between its raised and lowered positions.

2. The invention defined in claim 1 wherein each of said crank members is generally T-shaped and includes generally perpendicularly disposed first and second portions, one end of the first portion being mounted on the side of the crop-receiving body for vertical swinging movement, and the other end of the first portion being rigidly connected to an intermediate portion of the second member, the first and second transverse pivot members being disposed on opposite ends of the second member.

3. The invention defined in claim 2 wherein the second portion of each crank is inclined upwardly and rearwardly when the roof is in its lowered position, and wherein the first transverse pivot member is disposed on the forward end of the portion and the second transverse pivot member is disposed on the rearward end of the portion.

4. The invention defined in claim 3 wherein the parts are so arranged and constructed that as each crank swings from its position corresponding to the lowered position of the roof to its position corresponding to the raised position of the roof the first pivot member moves through an arc bisected by the transverse vertical plane containing the axis about which the crank is swingable, and the second pivot member moves through an arc bisected by the horizontal plane containing said axis.

5. The invention defined in claim 3 wherein the parts are so arranged and constructed that as each crank swings from its position corresponding to the lowered position of the roof to its position corresponding to the raised position of the roof the second pivot members moves through an arc bisected by the horizontaal plane containing the axis about which the crank is swingable.

6. The invention defined in claim 1 wherein the first and second transverse pivot members on each of the cranks is located in relation to the transverse axis about which the crank is swingable so that the first pivot member is below and the second pivot member is above the axis when the roof is in its raised position, and the first pivot member is forwardly of and the second pivot member is rearwardly of the axis when the roof is in its lowered position.

7. The invention defined in claim 1 wherein the crop-receiving body includes a rear door mounted for swinging movement into and out of closing relation with the rear of the body, and including means connecting at least one of the rear cranks with the door for controlling swinging of the latter.

8. The invention defined in claim 7 wherein the rear door is hinged at its lower end on the body to swing between a generally vertical closed position and a downwardly and rearwardly inclined opened position wherein it serves as a ramp for unloading crop material rearwardly from the body, the means connecting at least one of the rear cranks with the door comprising a flexible cable, and including a sheave rotatably mounted on the body and supporting the cable as the door is moved between its opened and closed positions.

9. The invention defined in claim 1 wherein the means acting between the crop-receiving body and one of the cranks on each side of the body for rotating the crank comprises an extensible and retractable hydraulic cylinder extending longitudinally along and spaced outwardly from the side of the body, the cylinder being connected at its rearward end to a forward portion of the front crank and at its forward end to the body.

10. In a crop-harvesting machine having a mobile frame, a crop-receiving body supported rearwardly on the frame and including a transversely spaced pair of longitudinally extending, vertical sidewalls, crop pickup and delivery means supported on the frame forwardly of the crop-receiving body for picking crop material up off the ground and delivering the same rearwardly to the crop-receiving body, and a roof supported on the body for movement between raised and lowered positions, the roof being operable to compress crop material contained in the body, means for effecting vertical movement of the roof comprising: a pair of front and rear crank members mounted on each side of the crop-receiving body for vertical swinging movement about longitudinally spaced transverse axes, each crank having a pair of transverse pivot members thereon spaced from the transverse axis about which the crank is swingable and from each other; a longitudinally extending rigid link connecting one of the transverse pivot members on each of the cranks in a fore-and-aft pair; a vertically extending rigid link interconnecting the other transverse pivot member on each crank with the roof; and means acting between the frame and one of the cranks on each side of the body for rotating the crank and thereby moving the roof vertically between its raised and lowered positions.

11. The invention defined in claim 10 wherein the relative locations of the transverse axis in the first and second transverse pivot members on one of the cranks in each front and rear pair is substantially identical to that on the other crank in the pair.

12. The invention defined in claim 10 wherein the transverse axes about which the cranks of each fore-and-aft pair are swingable are contained within the same horizontal plane, the relative locations of the transverse axis and the first and second transverse pivot members on each of the cranks is substantially identical, and the distance between the points on each longitudinal link where the link is connected to the first transverse pivot members on the fore-and-aft cranks in each pair is substantially identical to the distance between the transverse axes about which the cranks in the pair are swingable.

13. The invention defined in claim 10 wherein the crop-receiving body includes a rear door mounted for swinging movement into and out of closing relation with the rear of the body, and including means connecting at least one of the rear cranks with the door for controlling swinging of the latter.

* * * * *